United States Defensive Publication [19] (H) [11] T100,203

Lauck [43] Jan. 6, 1981

[54] LABEL ADHESIVE

[75] Inventor: John E. Lauck, Spring, Tex.

[73] Assignee: Shell Oil Company

[21] Appl. No.: 148,469

[22] Filed: May 9, 1980

Related U.S. Application Data

[63] Continuation of Ser. No. 15,531, Feb. 23, 1979, abandoned.

[51] Int. Cl.[3] ..... B31D 1/02; C08K 5/01; C08L 53/02

[52] U.S. Cl. ..... 428/40; 40/2 R; 260/33.6 AQ; 525/89; 525/99; 428/352; 428/355

[57] ABSTRACT

A label adhesive composition having the necessary balance of holding power, bleed and die cuttability comprises 40 to 70 parts of a linear or radial ABA-type monoalkenyl arene/conjugated diene block copolymer, 60 to 30 parts of an AB two-block copolymer, 20 to 300 parts of a tackifying resin and 0 to 100 parts of a rubber compounding oil.

8 Claims, No Sheets Drawing,

9 Pages Specification

The file of this unexamined application may be inspected and copies thereof may be purchased (849 O.G. 1221, Apr. 9, 1968).